June 27, 1950            D. V. ABEY            2,512,907

AUTOMOBILE GEAR SHIFTER

Filed March 7, 1946            2 Sheets-Sheet 1

Inventor
DAVID V. ABEY.
By Howard J. Whelan.
Attorney

June 27, 1950          D. V. ABEY          2,512,907

AUTOMOBILE GEAR SHIFTER

Filed March 7, 1946          2 Sheets-Sheet 2

Inventor
DAVID V. ABEY.
By Howard J. Whelan.
Attorney

Patented June 27, 1950

2,512,907

UNITED STATES PATENT OFFICE 2,512,907

AUTOMOBILE GEAR SHIFTER

David V. Abey, Baltimore, Md.

Application March 7, 1946, Serial No. 652,725

2 Claims. (Cl. 192—3.5)

This invention relates to transmission equipment and more particularly to those of a gear-shifting nature, applicable for use on motor vehicles or where conditions are of a nature that such equipment could be effectively and conveniently applied.

In a particular conventional form of transmission employed on motor vehicles, the gear shifting equipment connecting a clutch mechanism is mounted on the power driving unit, and the shaft leading to the wheels of a vehicle or other driven means, consists of a mechanical arrangement that is operated by a manually controlled shifter and the in-and-out control of the clutch pedal. Each speed is manipulated through the direct application of the pedal and without any automatic features connected with such. It has the disadvantage of requiring a handle or other physically operated device for the shifting of the gearing and involves the use of two limbs of the operator during the transaction.

It is an object of this invention to provide a new and improved shifting equipment unit that will avoid one or more of the disadvantages and limitations of the prior art.

Another object of this invention is to provide a new and improved shifting equipment unit that will be semi-automatic and afford an effective and efficient coordination between it and the transmission.

An additional object of this invention is to provide a new and improved shifting equipment unit that will be compact and economical in manufacture and may be readily interconnected with the emergency brake mechanism.

For a better understanding of the invention and for other objects thereof, reference is made to the appended drawings and the following description, which illustrate a particular form of this invention by way of example, while the scope of the invention is pointed out in the claims.

In the drawings.

Similar reference characters refer to similar parts throughout the drawings.

Figure 1:
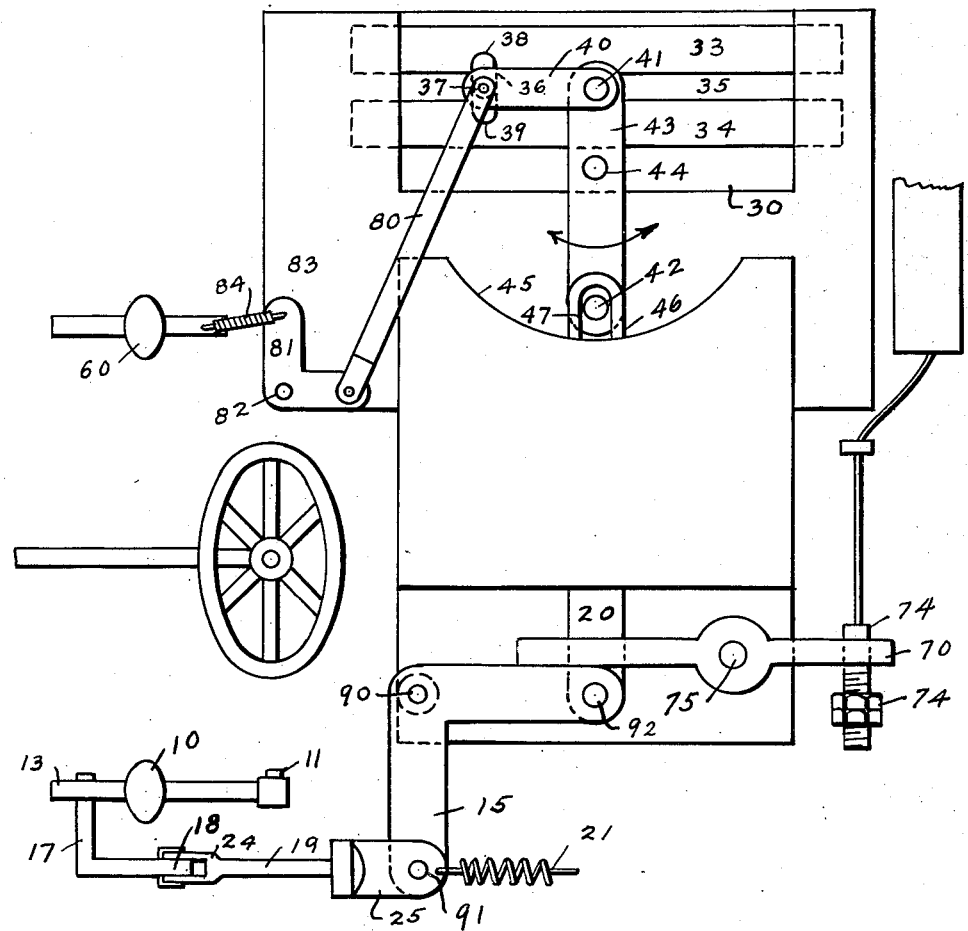
Figure 1 is a plan view of the shifter embodying this invention.
Figure 2:
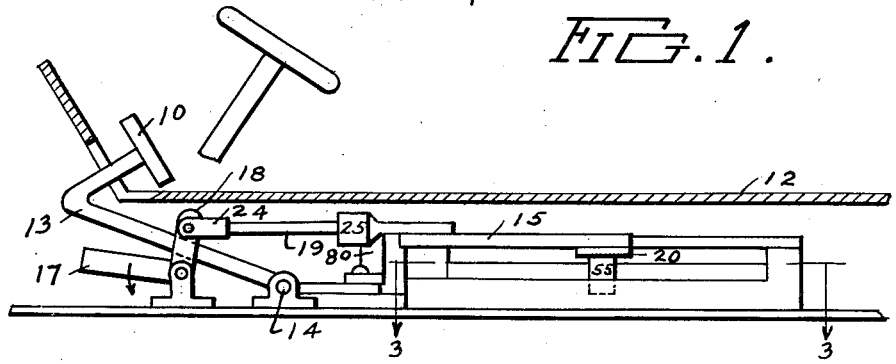
Figure 2 is a side elevation of Figure 1.

In the construction indicated in the drawings, a pedal 10 of a clutch mechanism 11, is mounted in a general manner to show its assembly on a motor vehicle. In this instance the shifting equipment unit is assumed to be located under the flooring 12 which is opened up in the drawings to permit its visualization. The arm 13 supporting the pedal 10, rotates, on a shaft 14 journalled on the flooring and operates the clutch attached to said vehicle. It is kept in its normal "up" position, by a coil spring tensioned to it from its holding place on the chassis of the vehicle.

A lug 17 on a bell crank 18 journalled on the chassis is located adjacent the arm 13. When the arm 13 travels arcuately it so aligns with the lug 17 as to contact and force it along in the same direction. When the bell crank 18 rotates on its shaft in the direction of the arrow, it pulls on the adjustable rod 19 and other incidental links 24 and 25 and bell crank 15 required to pass between the structural features of the chassis. It induces the link 20 and travelling lever 46 to move in a sidewise direction with respect to the front of the vehicle. The tension of a coil spring 21 returns the bar 46 and incidental mechanism 18, 19, 24, 25, 15 and 20 to the rearward position, as soon as the clutch pedal is released. The bell crank 15 is attached by pin 90 to the plate, the link 25 is connected by pin 91 mechanism 20 by pin 92.

A shifter unit for operating the gears used in the transmission for changing the speed transmitted from the motor to the wheels through this mechanism, consists of a housing 30 installed over the gears. The housing is so aligned with guide channels 31 and 32 with respect to these gears that the operation of the shifter fingers 33 and 34 respectively slide within them in an appropriate way and will push the gears into predetermined reduction relation. The finger 33 travels in one direction to induce "reverse," and in the opposite for "low and forward." The finger 34 likewise induces "second speed" in one direction and "high speed" in the opposite. The fingers are separated phpsically from each other by an intermediate guide partition 35, having an opening 36 transversely therethrough sufficiently large for a pusher 37 to pass through. This opening 36 aligns with slots 38 and 39 provided at the sides of the fingers 33 and 34 respectively as shown in the drawings.

The pusher 37 is mounted on one side of a link 40 and extends into the slot 36, when the shifter fingers are in neutral position. At the same time the slots 38 and 39, as well as the opening 36 are aligned with one another. The pusher 37 is moved in and out of slots 38 and 39 through the operation of the brake pedal 60. The link 80 is connected to the link 40 at one end and to a bell crank 81 at the other. The bell crank is pivotly connected at 82 to a support 83. A spring 84 connects the bell crank 81 to the brake pedal 60.

The link 40 is pivotly held by a pin 41 securing it to a lever 43 which rocks on a circular pin 44 situated in the housing structure by the side of the guide channel 32. The other end of the lever 43 supports a laterally disposed pin 42 and is contoured in rounded outline. The rounded contour enables the lever 43 to travel arcuately on its pin 44 so that its periphery will follow close to the curved edge surface 45 of an internal recess in which it operates.

An important intermedium is employed to couple the lever 43 with the mechanism 20, 15 and 19, and transmit the effect of the pedal 10 to the gears. This intermedium comprises a travelling lever 46, fitted with a longitudinal slot 47 adjacent one end and freely enclosing the round projecting pin 42. This pin and slot are so arranged with regard to each other that their peculiar and different movements will not obstruct their operative functioning during their various motions.

The intermedium is directed in its travel in two directions, one being linear and the other oscillatory. The oscillatory travel takes place close to the longitudinal slot 47 and pin, 42 respectively. This motion is induced by a stub 48 on the underside of the intermedium that travels in recess 49 of pear-like contour in the housing and is directed to the right or left as the case may require by a resilient switch 50 installed therein. This switch rotates through a predetermined arc on either side of the stub 48 and induces it to follow the selected path for the rest of its travel. The switch has a semi-circular base to enable it to make the rotation readily about the pin 51 which secures it, while it is bevelled towards the front 52 to facilitate the guiding of the stub. The spring 53 is aligned with the normal neutral center line of the switch at one end and is positioned at the other end in a cut out portion 60 of a shifter 61 and tensioned to produce a toppling effect on both sides of the center line when the switch is rotated suitably. When the stub 48 is pulled back far enough it follows the housing groove 54 sufficiently to be out of contact with the switch front, but when pushed forward to be guided thereby and contact the cut-out portion 60 and cause the shifter 61 to move to the opposite side and pull the front 52 with it and retain the stub 48 in the upper end of the recess 49 until the lever 46 completes its travel in that direction. The linear guiding of the intermedium is induced by the sliding of a secondary stub 55 in the housing groove 56 which is straight and in line with the axis of the unit.

A special feature provided with the construction of this unit, is in the mechanism of the emergency brake of the vehicle on which the device is used. The brake proper is of conventional form and is actuated through a cable. The cable is operated by a handle, which in turn is hooked at the end to enable it to be secured at some convenient place on the chassis, a coil spring applies suitable tension. At a predetermined point on the cable is installed a bolt 71 with adjustable nuts 74 that will engage in the bar 70 pivoted at 75 and enable it to hold same, when the emergency brake is applied. The emergency brake handle is pulled in the customary manner and in doing so operates the shifter unit to place it in neutral position. When released the handle and cable is pulled back by the tension of the coiled spring and permits the shifter to operate under the action of the clutch and brake pedals.

The operation of the device is relatively simple. The clutch pedal 10 is pushed down until it contacts the lug 17.

Figure 7:
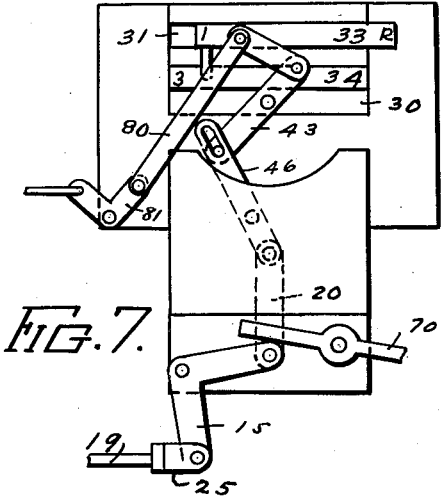
Figure 7 is a view similar to Figure 4 but showing the device in reverse gear.
Figure 3:
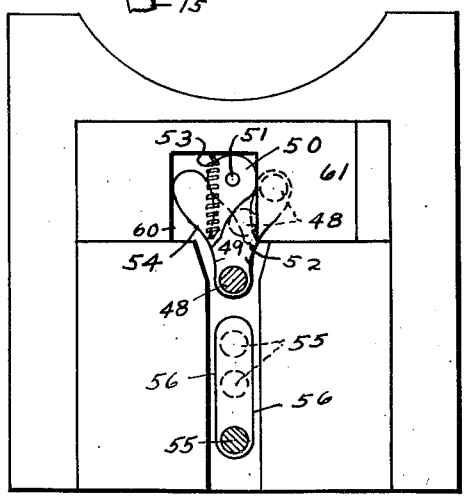
Figure 3 is a sectional view taken along line 3—3 of Figure 2.

The bell crank 18, and other parts 19, 25, 15 and 20 are operated thereby and cause the intermedium lever 46 to move from the neutral position shown in Figure 1, by proceeding across the housing so that the stub 55 follows the groove 56 and the stub 48 moves out of the groove 54 into the recess 49 where it follows along the front 52 into the right hand slot. As it does so the intermedium is angularly turned in the same direction and causes the sides of its slot 47 to rotate the lever 43 on its pin 44 so that the link 40 also moves. The link 40 by reason of the slots 38 and 39 has its pin 37 guided into the finger 33 from the finger 34 when the brake pedal 60 is used. A further pressure on the clutch pedal increases the movement of the mechanism and forces the finger 33 into reverse (as shown in Figure 7), as the brake pedal 60 is released.

Figure 4:
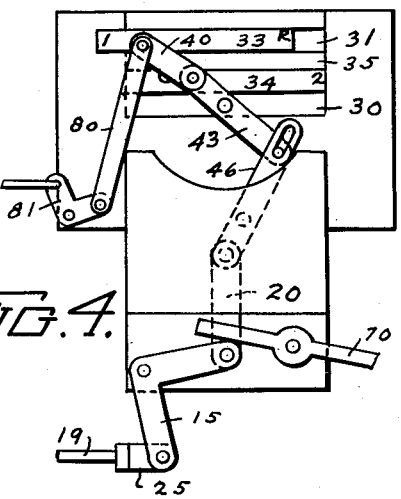
Figure 4 is a plan view of the shifter positioned in low gear.
Figure 5:
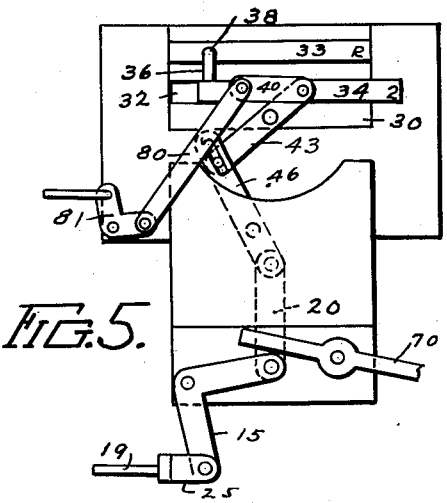
Figure 5 is a view similar to Figure 4 but showing the device in No. 2 gear.
Figure 6:
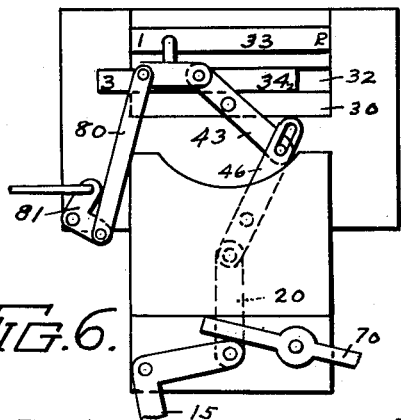
Figure 6 is a view similar to Figure 4 but showing the device in high gear.

To change the operation of the vehicle to forward first (Figure 4), requires the pushing of the clutch pedal in, without the foot brake pedal 60, until the link 40 with its pusher 37 and slots 38 and opening 36 are aligned in the fingers and partition that the pusher resiliently rises and sets in the finger 33. A further movement of the clutch pedal 10 makes the finger 34 go to second (Figure 5), and operate the gears. When the clutch pedal is raised it causes the finger 34 to return and force it back into high (Figure 6) and the gears with it. The operator then lifts his foot off the clutch pedal and the vehicle will proceed along in high. The switch 52 guides the pin 48 automatically as the operator operates the clutch and brake pedals to suit his wishes.

When you stop in high gear and wish to go to low gear, you push clutch in halfway for breaking clutch, and apply foot brake. Now push clutch all the way in then let it out half-way, and trip again, while holding foot brake down. This is similar to the ordinary method except the double trip on clutch. To go from low to second use the feet in the ordinary method and the car will automatically go into second. Second to high will be the same as first to second. If you wish to go from high to reverse, trip clutch once using foot brake, proceed as usual.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described in the invention, what is claimed is:

1. A gear shifting arrangement comprising in combination a housing, a clutch operating pedal, a brake pedal and emergency brake, a plurality of shifting fingers operably positioned in said housing, means pivotally connected to said housing for actuating said fingers in predetermined coordination, an intermedium guidably attached to said housing for operating said means, a mechanism operable by the clutch pedal for actuating said intermedium and shifting said gears, said shifter fingers having slots for receiving said first mentioned means, means for connecting said fingers to the transmission gearing and actuating same in a predetermined manner, means operable by the brake pedal for positioning the first mentioned means in one of the shifting finger slots, and means attached to the emergency brake for positioning the device in a neutral position.

2. A gear shifting arrangement comprising in combination a housing, a clutch operating pedal, a brake pedal and emergency brake, a plurality of shifting fingers operably positioned in said housing, means pivotally connected to said housing for actuating said fingers in predetermined coordination, an intermedium guidably attached to said housing for operating said means, a mechanism operable by the clutch pedal for actuating said intermedium and shifting said gears, said shifter fingers having slots for receiving said first mentioned means, means for connecting said fingers to the transmission gearing and actuating same in a predetermined manner, means operable by the brake pedal for positioning the first mentioned means in one of the shifting finger slots, means attached to the emergency brake for positioning the gear shifting mechanism in a neutral position, and switching means pivotally connected to said housing for controlling the oscillating action of said intermedium during the movement of said gearing from "neutral" to "high" "low" and "medium" positions.

DAVID V. ABEY.

REFERENCES CITED

The following references are of record in the file of this patent:

UNITED STATES PATENTS

| Number | Name | Date |
| --- | --- | --- |
| 1,706,553 | Stucatur | Mar. 26, 1929 |
| 1,844,550 | Alspaugh | Feb. 9, 1932 |
| 2,085,257 | Getaz | June 29, 1937 |
| 2,090,791 | Getaz | Aug. 24, 1937 |
| 2,208,828 | Adams | July 23, 1940 |
| 2,209,415 | McNally | July 30, 1940 |
| 2,252,158 | Bixby | Aug. 12, 1941 |